March 27, 1956 — C. T. LANSTROM — 2,739,764
COLLAPSIBLE SPOOLING REEL
Filed Jan. 21, 1954 — 5 Sheets-Sheet 1

Inventor:
CARL T. LANSTROM,
by: Donald G. Dalton
his Attorney.

March 27, 1956

C. T. LANSTROM 2,739,764

COLLAPSIBLE SPOOLING REEL

Filed Jan. 21, 1954

Inventor:
CARL T. LANSTROM,
by: Donald G. Dalton
his Attorney.

March 27, 1956 — C. T. LANSTROM — 2,739,764
COLLAPSIBLE SPOOLING REEL
Filed Jan. 21, 1954 — 5 Sheets-Sheet 3

Inventor:
CARL T. LANSTROM,
by: Donald G. Dalton
his Attorney

March 27, 1956     C. T. LANSTROM     2,739,764
COLLAPSIBLE SPOOLING REEL

Filed Jan. 21, 1954     5 Sheets-Sheet 5

Inventor:
CARL T. LANSTROM,
by: Donald G. Dalton
his Attorney

United States Patent Office 2,739,764
Patented Mar. 27, 1956

2,739,764
COLLAPSIBLE SPOOLING REEL

Carl T. Lanstrom, Concord, Calif., assignor to United States Steel Corporation, a corporation of New Jersey Application January 21, 1954, Serial No. 405,316

5 Claims. (Cl. 242—113)

This invention relates to a reel for spooling wire or like products, having a coil core or drum which may be contracted or collapsed slightly to facilitate the removal of a spool or coil wound thereon.

The object of my invention is to improve generally on the reels of Patents 2,529,185 and 2,648,503. More particularly, it is the object of this invention to provide a reel of simplified construction and greater ease of operation.

In a preferred embodiment, I provide a cylindrical reel body or arbor having a disc at one end, with a coil core or drum composed of a plurality of cylindrical segments movable radially of the body but non-rotatable relative thereto. I incorporate cone-and-wedge means in the body for expanding the segments and provide circumferential springs for contracting them. A hub is mounted at the other end of the body and a flange is removably fitted over the hub. The disc and flange are bored to receive the ends of the segments and the flange has a portion interfitting with the adjacent ends of the segments whereby the flange is held in place when the segments are expanded.

A complete understanding of the invention may be obtained from the following detailed description and explanation which refer to the accompanying drawings illustrating the present preferred embodiment. In the drawings, Figure 1 is an end elevation;

Figure 1:
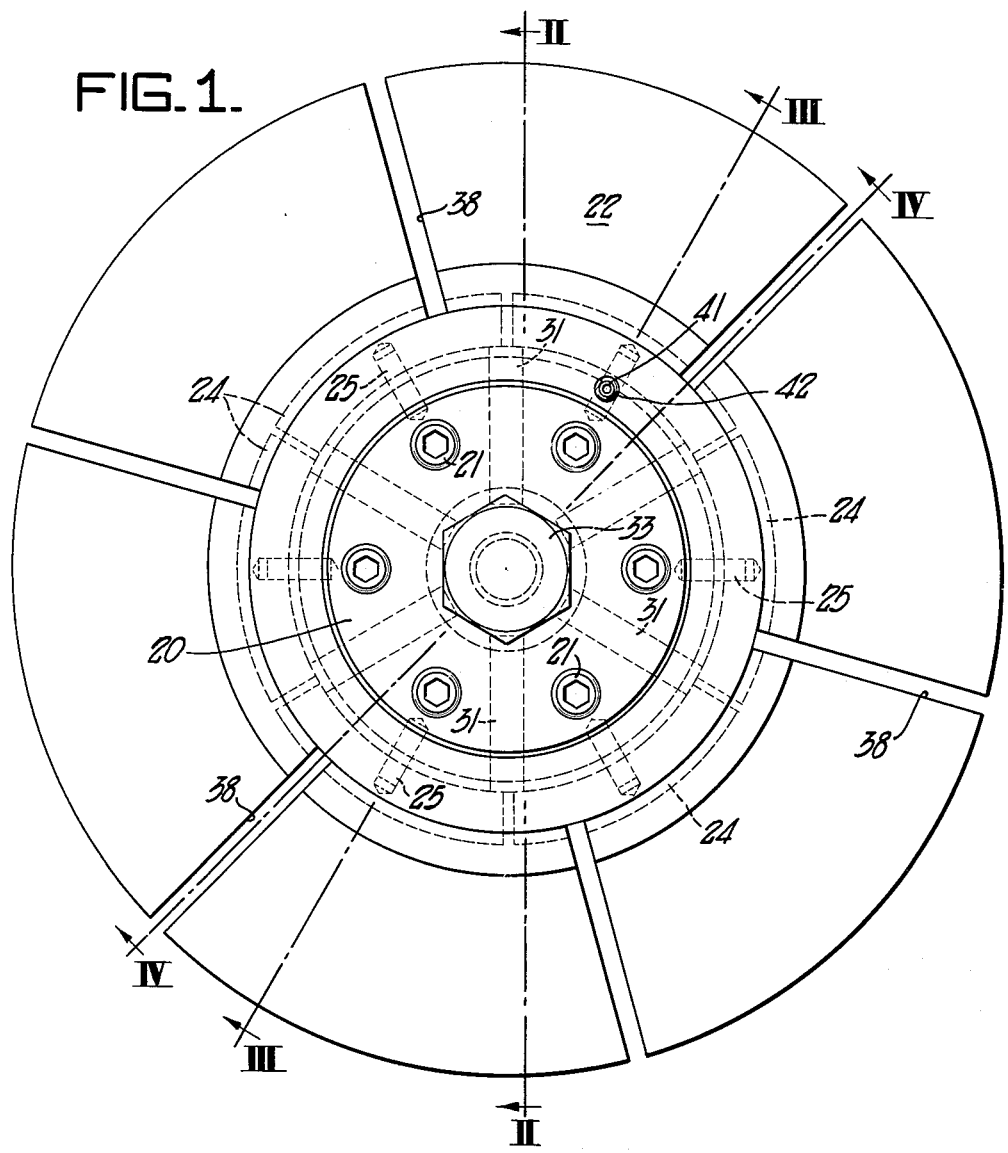

Referring now in detail to the drawings, a cylindrical reel body or arbor 10 has a disc 11 secured thereto at one end by screws 12. A bore 13 is formed in the inner face of the disc for a purpose which will appear shortly. Disc 11 is secured to an adapter plate 14 by screws 15 after the adapter plate has been mounted on the flange 16 of a driving spindle 17 by screws 18. Disc 11 has a central hole therein to accommodate a shouldered bearing pin 19.

A hub 20 is secured by screws 21 to the end of body 10 opposite that to which disc 11 is secured. A flange 22 is removably fitted over the hub and has a bore 23 in the inner face thereof. A drum or coil core of cylindrical segments 24 surrounds reel body 10. The segments are coaxial with body 10 and extend between the disc 11 and flange 22 with their ends in bores 13 and 23, respectively. The segments are movable radially of the reel body but are non-rotatable about it, being loosely doweled thereto by pins 25. Contractile springs 26 positioned in grooves 27 adjacent the ends of the segments, tend to pull the latter inwardly toward the reel body. A lip 28 on hub 20 surrounds the outer end of the segments and the wall of bore 13 similarly confines their inner ends. The drum formed by segments 24, together with disc 11 and flange 22, defines a space to accommodate a coil wound on the reel by driving spindle 17.

Reel body 10 has an axial bore 29 therethrough with radial slots 30 at each end spaced circumferentially and intersecting the bore. Wedges 31 movable radially in the slots engage the segments 24 interiorly. An expander plug 32 is slidable in bore 29 and has frusto-conical end portions engaging the wedges in the slots at opposite ends of the reel body, respectively. A screw 33 threaded through a tapped hole in the center of hub 20 engages the outer end of plug 32 to force it inwardly causing the wedges to expand the segments. The inner end of the plug has an axial bore 34 therein. Pin 19 fits slidably in bore 34 and confines therein a compression spring 35 effective to retract plug 32 when screw 33 is backed off.

Figure 2:
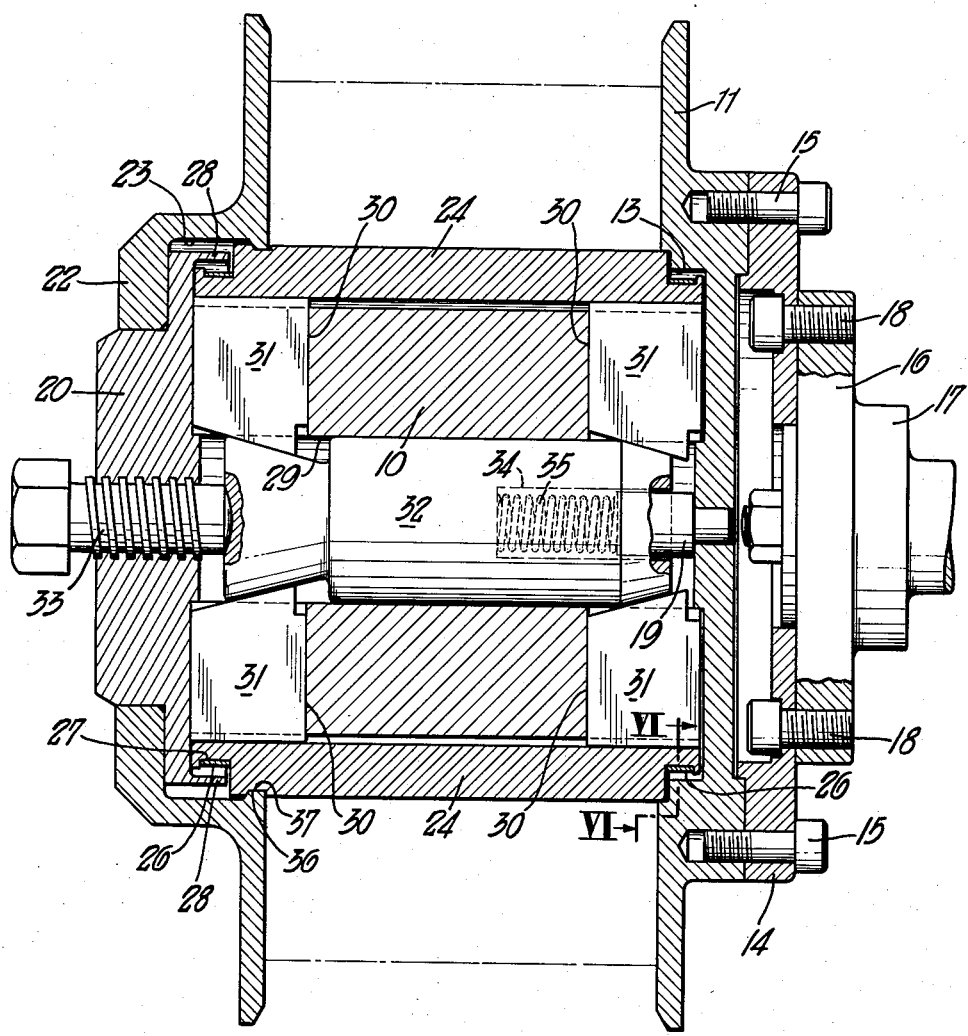
Figures 2, 3 and 4 are longitudinal sections taken along the plane of line II—II, III—III and IV—IV, respectively of Figure 1.
Figure 3:
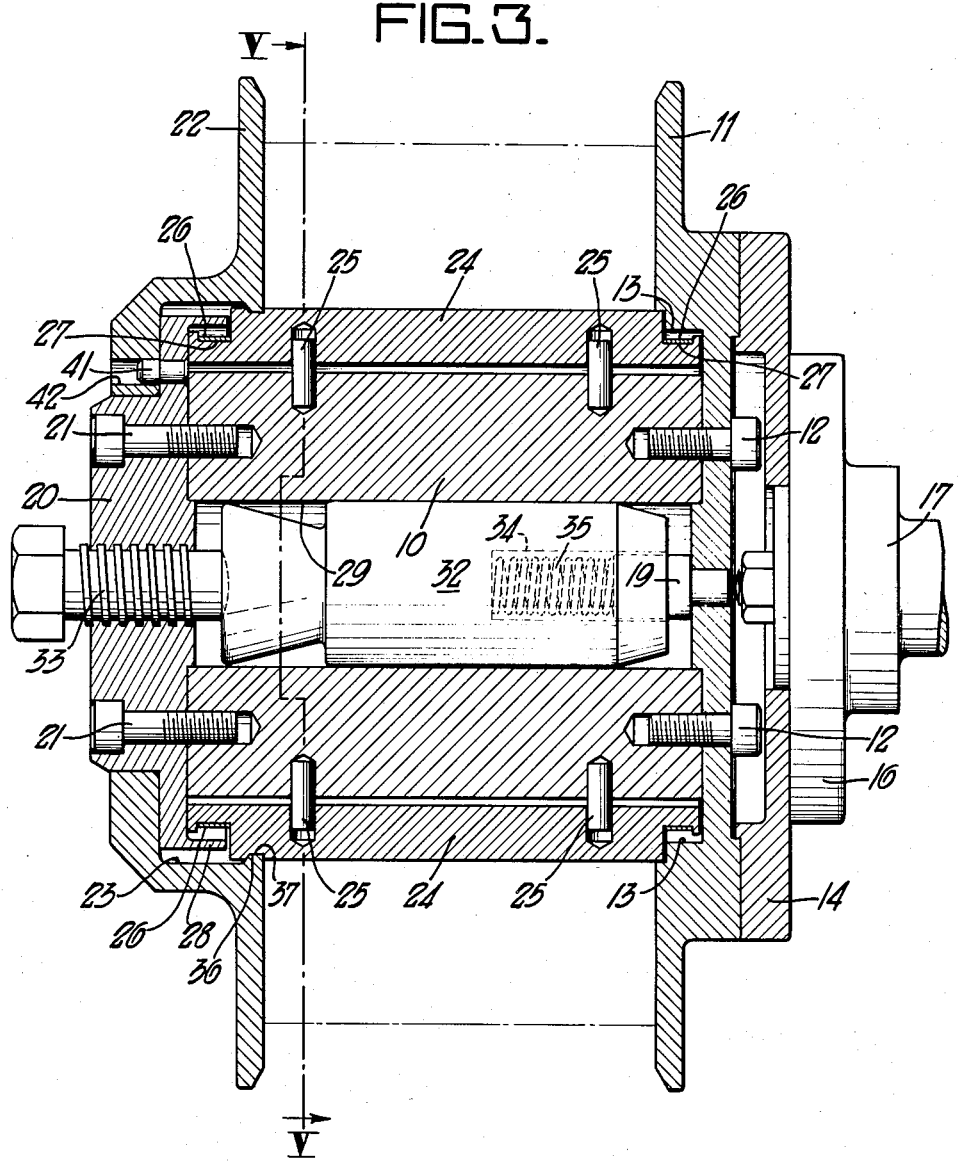
Figure 4:
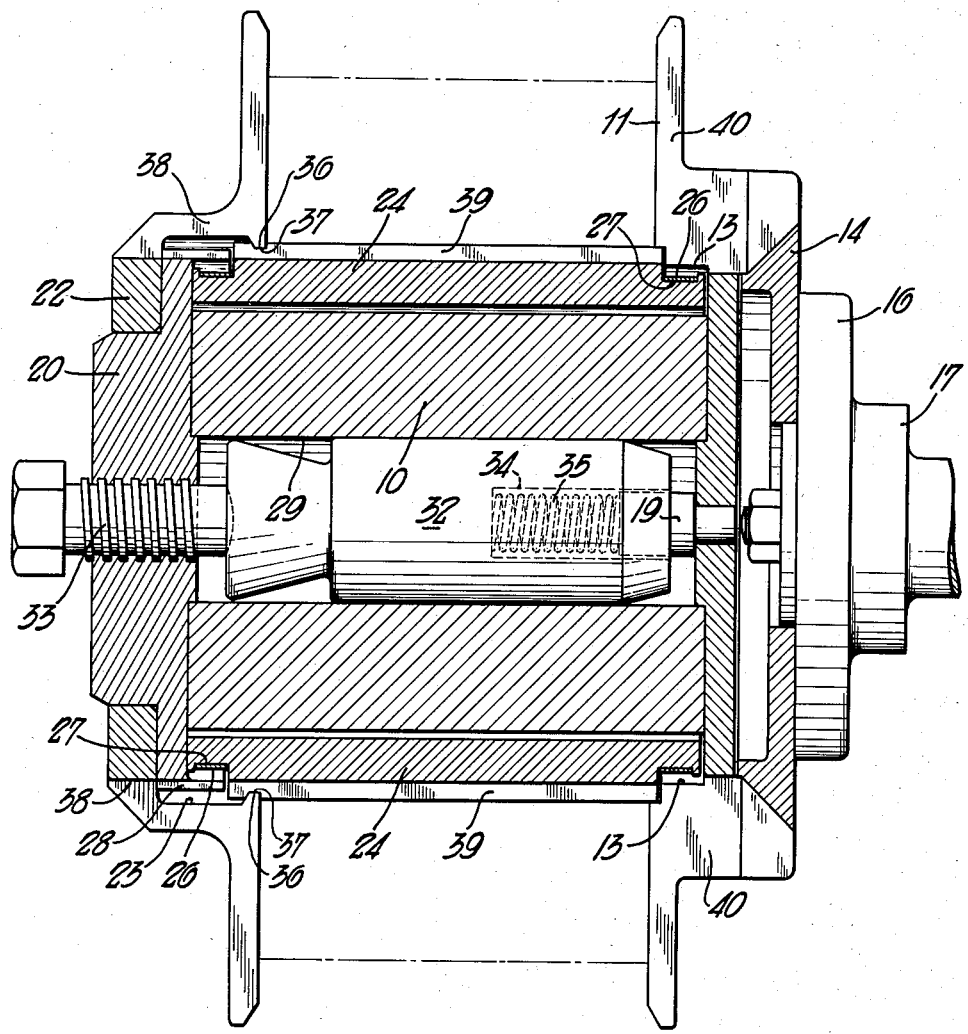
Figure 5:
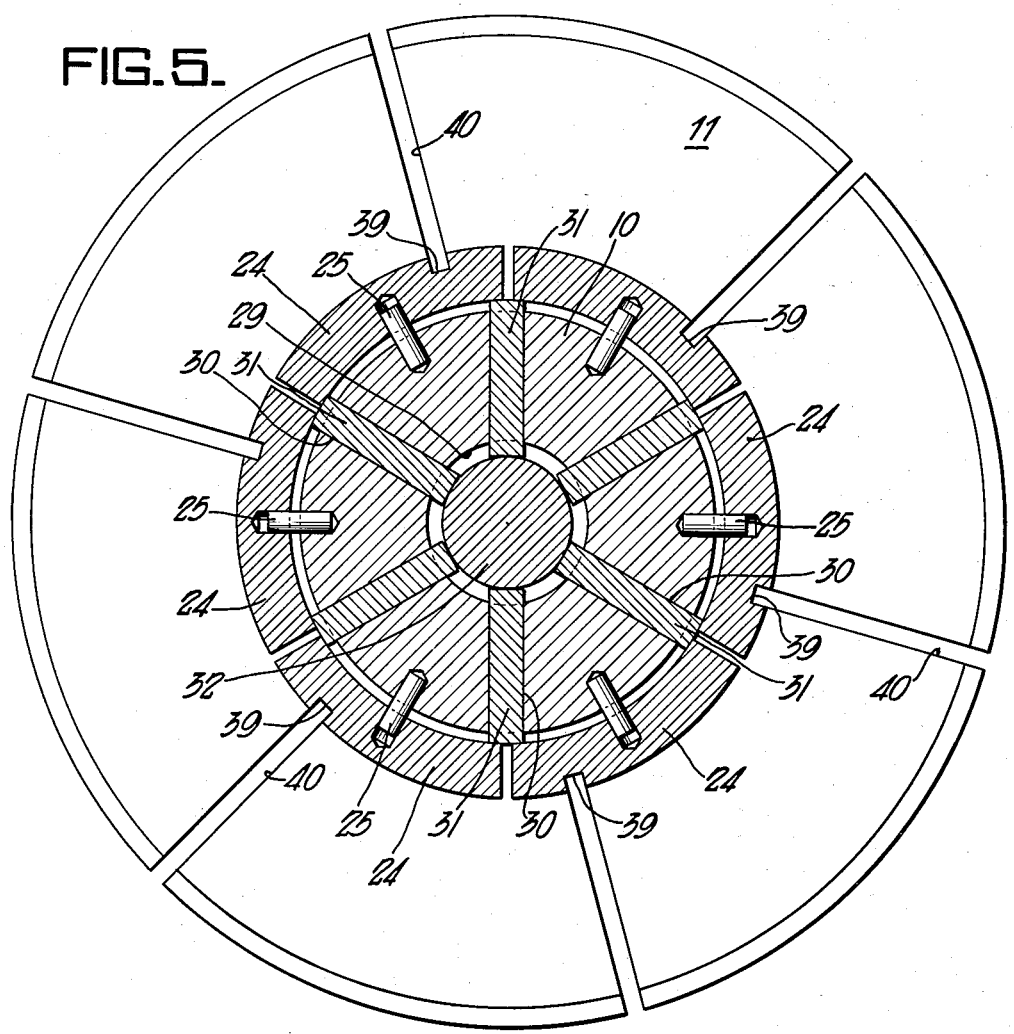
Figure 5 is a cross-section taken along the plane of line V—V of Figure 3.
Figure 6:
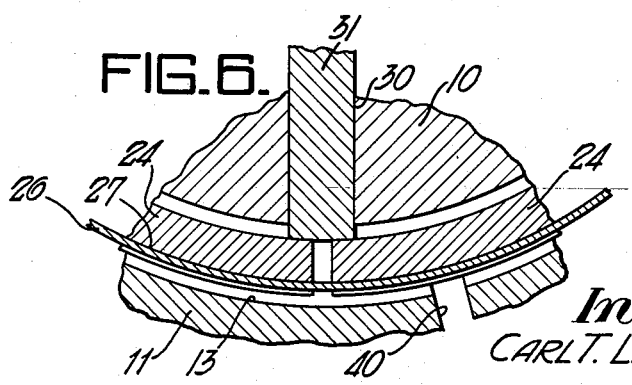
Figure 6 is a partial cross-section to enlarged scale taken along the plane of line VI—VI of Figure 2.

It will be evident from the foregoing that the segments 24 may be expanded or contracted relative to reel body 10 by turning screw 33 in the proper direction. Figure 2 shows the segments in their fully expanded or starting position. In this position, flange 22 is held in place by a tongue 36 extending inwardly from the wall of bore 23 and fitting in a circumferential groove 37 formed in the segments 24 adjacent their outer ends but inwardly of groove 27. When a coil of wire or the like has been wound on the reel, segments 24 are contracted by backing off screw 33 whereupon flange 22 may first be removed and then the coil itself.

It is desirable to apply binding wires to the coil before removing it from the reel. Accordingly, flange 22, segments 24 and disc 11 have radial slots 38, 39 and 40, respectively, spaced circumferentially thereof, permitting the insertion of binding wires through the coil. To insure proper alinement of slots 38 with the slots 39 and 40, when flange 22 is replaced after removal of a coil, a registering pin 41 is mounted in hub 20 near the periphery thereof and the flange has a hole 42 positioned to accommodate the pin.

My improved reel construction has the advantages of simplicity and exceptionally easy operation. The several parts are designed to withstand hard usage. When they are properly made and fitted, there is little or nothing that can get out of order in normal use. The disc 11, flange 22 and segments 24 are the only parts subject to much wear and they can all be easily replaced. The contraction of the segments is effected positively by restoring spring 35 and circumferential springs 26 so that both expanding and contracting movements of the plug, wedges and segments occur smoothly and without binding. The tongue-and-groove relation of the flange with the segments affords a simple yet effective and automatic-means for securing the flange in place prior to coiling and releasing it for removal prior to stripping a coil from the reel.

Although I have disclosed herein the preferred embodiment of my invention, I intend to cover as well any change or modification therein which may be made without departing from the spirit and scope of the invention.

I claim:

1. A collapsible spooling reel comprising a cylindrical body having an axial bore therein, a disc secured to one end of said body and a hub secured to the other end, a flange removably fitted on said hub, said disc and flange having bores in their adjacent faces larger in diameter than said body, a drum of cylindrical segments surrounding said body and loosely doweled thereto for radial movent, the ends of said segments extending into said bores in the disc and flange whereby outward movement of the segments is limited, radial slots in said body intersecting said bore, wedges slidable in said slots adapted to engage said segments on the interior thereof, an expander plug slidable in the bore in said body and engageable with said wedges, and a screw threaded through said hub adapted to engage the adjacent end of said plug.

2. Apparatus as defined in claim 1 characterized by a guide pin on said disc extending into the bore in said body, said plug having a bore in its other end, said pin fitting in said last-mentioned bore.

3. Apparatus as defined in claim 1 characterized by said slots and wedges being disposed relative to the segments so that each wedge engages the edges of a pair of adjacent segments.

4. Apparatus as defined in claim 1 characterized by a compression spring urging said plug against said screw.

5. Apparatus as defined in claim 1 characterized by said hub having a bore, the ends of the segments adjacent the hub being turned down to fit in the bore in the hub.

References Cited in the file of this patent

UNITED STATES PATENTS

| | | |
|---|---|---|
| 1,167,721 | Scott | Jan. 11, 1916 |
| 1,957,974 | Moreno | May 8, 1934 |
| 2,285,826 | Naumann | June 9, 1942 |
| 2,443,243 | Hapsen | June 15, 1948 |
| 2,529,185 | Proctor | Nov. 7, 1950 |
| 2,556,149 | Talbot | June 5, 1951 |